INVENTORS
Walter E. Sargeant
John M. Farrell
BY Edward F. Weller, Jr.

Their Attorney

United States Patent Office 3,093,763
Patented June 11, 1963

3,093,763
PRINTED CIRCUIT MOTOR
Walter E. Sargeant, Clawson, John M. Farrell, Detroit, and Edward F. Weller, Jr., Birmingham, Mich., assignors to General Motors Corporation, Detroit, Mich., a corporation of Delaware
Filed Mar. 22, 1960, Ser. No. 16,729
3 Claims. (Cl. 310—154)

This invention relates to electric motors and more particularly to an improved electric motor having a printed circuit rotor and a permanent magnet field.

It already has been proposed to provide an electric motor that has a printed circuit rotor and a permanent magnet field and the present invention is therefore an improvement over the heretofore known types of printed circuit motors.

One of the primary objects of this invention is to provide a printed circuit motor that is shorter in axial length and lighter in weight than those heretofore known.

Another object of this invention is to provide a motor including a printed circuit rotor and a fixed permanent magnet that is formed as one integral annular piece and which is magnetized to form alternate sectors of opposite magnetic polarities. In carrying forward this object, the permanent magnet is preferably formed of a ferrite material.

Still another object of this invention is to provide a motor having a printed circuit rotor and permanent magnet field wherein the brushholders of the motor project through the permanent magnet and carry brushes that directly contact the radially extending conductors of the printed circuit rotor.

Further objects and advantages of the present invention will be apparent from the following description, reference being had to the accompanying drawings, wherein preferred embodiments of the present invention are clearly shown.

Figure 1:
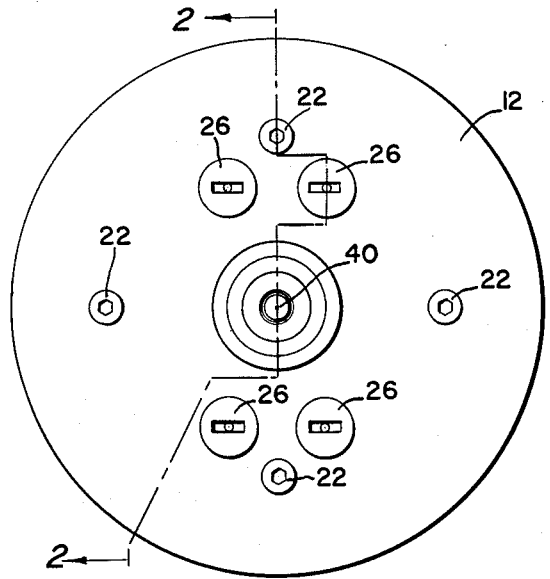
FIGURE 1 is an end view of a printed circuit motor made in accordance with this invention.
Figure 2:
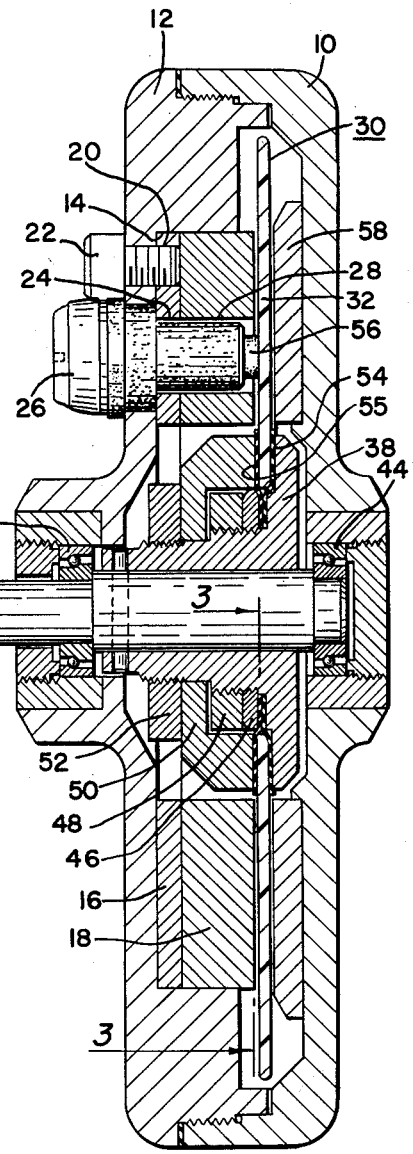
FIGURE 2 is a sectional view taken along line 2—2 of FIGURE 1 and on an enlarged scale.
Figure 3:
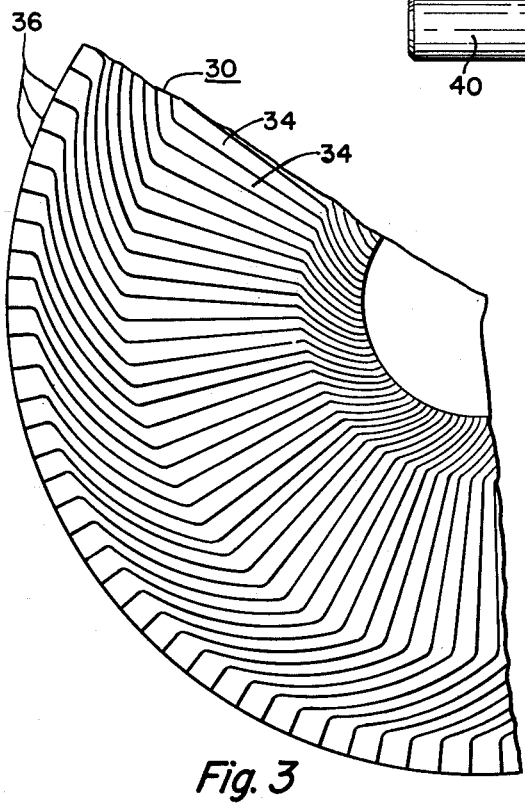
FIGURE 3 is a view taken along line 3—3 of FIGURE 2 and showing a portion of the printed circuit rotor.

Referring now to the drawings and more particularly to FIGURE 2, it is seen that the motor of this invention includes a pair of annular shaped housings 10 and 12, which are preferably formed of aluminum material, the housing 12 having circumferentially extending threads which match with circumferentially extending threads formed on the housing 10. It thus is seen that the two housings may be screwed together for assembly and may be unscrewed for disassembly.

The stator of the motor of this invention is generally designated by reference numeral 14 and includes an annular member or stator yoke 16 formed of soft iron that is bonded to the annular permanent magnet 18 by a suitable adhesive. In fabricating this stator assembly 14 the annular stator yoke 16 is machined completely before being bonded to the permanent magnet 18. The yoke 16 is formed with four holes 20 which accommodate the fasteners 22 and is formed with four holes 24, which accommodate the brushholders 26. The permanent magnet 18 is formed of a ferrite material and is one unitary annular piece of material. After the yoke is bonded to the permanent magnet 18, the permanent magnet is formed with four holes 28 which are in alignment with the holes 24 and which also serve to accommodate the brushholders 26.

After the field assembly 14 is fabricated as described above, the field assembly is fitted to a magnetizing fixture which magnetizes alternate sectors of the field assembly to provide alternate north and south poles. After the field has been magnetized, it is ready for assembly to the housing 12 and it is seen that the fasteners 22 secure the field assembly to the housing 12 by fitting within the threaded openings 20 formed in the yoke 16. It can be seen from the foregoing that the field assembly thus comprises the solid annular permanent magnet 18 and the soft iron yoke 16 and it is further seen that the brushholders 26 pass through both the yoke 16 and the ferrite permanent magnet 18. It is to be noted that the poles of the permanent magnet 18 are not evident from a physical inspection of the same. These poles can be defined, however, if iron filings are placed on the magnet.

The rotor of the motor of this invention includes an annular printed circuit member generally designated by reference numeral 30. This printed circuit member is formed of an insulator member 32 of plastic material or the like, which carries at its opposite sides the conductors 34. The conductors 34 on one side of the insulator member 32 are joined to the conductors on the opposite side of the insulator board along points 36 and this junction or connection is made by soldering the ends of the conductors together at points 36. The printed circuit may be made in any well known manner, for example, it may be made by an etching process wherein solid sheets of copper are etched to form the radially extending conductors and the sheets are then bonded to opposite sides of the insulator 32. It is, of course, necessary to trim the excess material from the copper sheets following the bonding to the insulator member 32 and it is also necessary to join the edges of the conductor 34 along points 36.

The rotor assembly further includes an armature hub 38 which is keyed to a shaft 40. The shaft 40, as is clearly apparent from FIGURE 2, is journalled for rotation within ball bearings 42 and 44.

The printed circuit member 30 is fixed to the armature hub 38 by means of a metal washer 46, a nut 48, an armature assembly washer 50 and an armature assembly nut 52.

When it is desired to secure the printed circuit 30 to the hub member 38, the various parts as described above are assembled to the hub member 38. In securing the printed circuit 30 to the hub member 38, it is necessary to connect the inner ends of conductors 34 on opposite sides of the insulator 32 together. This is accomplished by the washer 46 and the nut 48 which serve to bend the inner ends of the conductors 34 together by compressing them between the washer 46 and the hub 38. It will, of course, be appreciated that the insulating washers 54 and 55 serve to insulate these conductors, respectively, from the washers 46 and 50 and from the hub member 38.

It can be seen from the drawing that the housing 10 carries a soft iron yoke 58 which may be bonded thereto by a suitable adhesive, the yoke member being positioned directly across from the ferrite permanent magnet 18.

In the operation of the motor just described, the brushes 56 contained within the brushholders 26 ride on the radially extending conductors 34. When these brushes are connected with a suitable source of voltage, the armature or rotor assembly will be rotated to supply motive power to the shaft 40. During the operation of the motor the magnetic flux path may be traced from the magnetized sectors of the permanent magnet 18, through the printed circuit member 30, into the soft iron member 58 and thence through printed circuit member 30 back to the field assembly 14. By employing a permanent magnet of unitary construction, the axial dimension of the printed circuit motor of this invention has been greatly reduced as compared to those heretofore known. In addition, by providing an arrangement wherein the brushholders pass through the unitary permanent magnet, the axial dimension of the motor is again reduced as compared to heretofore known printed circuit motors.

While the embodiments of the invention as herein disclosed constitute preferred forms, it is to be understood that other forms might be adopted.

What is claimed is as follows:

1. An electric motor comprising, first and second end frames formed of nonmagnetic material having cooperating threaded portions connecting the end frames to form a housing, a yoke member formed of magnetic material secured to an inner wall of one of said nonmagnetic end frames, a second yoke member formed of magnetic material secured to an inner wall of the other end frame and in opposed relationship to said first yoke member, and a permanent magnet secured to one of said yoke members, said permanent magnet being formed as a unitary annular piece of ferrite material having alternate sections magnetized as north and south poles, the end of said permanent magnet defining an annular wall which is substantially flat and which lies in a plane that is normal to the longitudinal axis of said end frames, a shaft journalled for rotation in said end frames, an armature assembly carried by said shaft including a printed circuit member having radially extending conductors, said armature assembly being positioned between the flat end wall of said permanent magnet and one of said yoke members, and brush holders extending through one of said yoke members and said permanent magnet and carrying brushes that engage said printed circuit member.

2. An electric motor comprising, first and second end frames forming a housing, a first yoke member formed of magnetic material secured to an inner wall of one of said end frames, a second yoke member formed of magnetic material secured to an inner wall of the other end frame and facing said first yoke member, a permanent magnet secured to said second yoke member formed of a unitary annular piece of ferrite material having alternate sections magnetized as north and south poles, said permanent magnet having an annular substantially flat end face which is located in a plane that is normal to the longitudinal axis of said end frames, a shaft journalled for rotation in at least one of said end frames, a printed circuit member carried by said shaft having radially extending conductors, said printed circuit member being disposed between the flat end face of said permanent magnet and said first yoke member, and a plurality of brush holders mounted in openings formed in said second yoke member and said permanent magnet, said brush holders carrying brushes which engage said printed circuit member at positions adjacent the annular flat end face of said permanent magnet.

3. An electric motor comprising, first and second end frames connected together to form a housing, a first yoke member formed of magnetic material secured to an inner wall of one of said end frames, a second yoke member secured to an inner wall of the other frame and facing said first yoke member, a permanent magnet secured to said second yoke member formed as an annular unitary piece of ferrite material having alternate sections magnetized as north and south poles, said permanent magnet having an annular end wall which is substantially flat and which lies in a plane that is normal to the longitudinal axis of said end frames, a rotatable shaft, a printed circuit member carried by said shaft having radially extending conductors, said printed circuit member being positioned between the flat end face of said permanent magnet and said first yoke member, and brush holders carrying brushes which are engageable with said printed circuit member.

References Cited in the file of this patent

UNITED STATES PATENTS

| 2,722,617 | Cluwen | Nov. 1, 1955 |
| 2,779,882 | Ishikawa | Jan. 29, 1957 |
| 2,782,721 | White | Feb. 26, 1957 |
| 2,894,156 | Kent | July 7, 1959 |
| 2,970,238 | Swiggett | Jan. 31, 1961 |

OTHER REFERENCES

"Electronics," March 20, 1959, Fig. 2, pages 70–73, "D.C. Motor has Printed Armature."